US008250709B2

United States Patent
Jou

(10) Patent No.: US 8,250,709 B2
(45) Date of Patent: Aug. 28, 2012

(54) ROTATING MECHANISM FOR AN ELECTRONIC DEVICE AND AN ELECTRONIC DEVICE WITH THE SAME

(75) Inventor: Yu-Tang Jou, Sanchung (TW)

(73) Assignee: Kye Systems Corp., Sanchung, Taipei Hsien (TW)

( * ) Notice: Subject to any disclaimer, the term of this patent is extended or adjusted under 35 U.S.C. 154(b) by 450 days.

(21) Appl. No.: 12/591,185

(22) Filed: Nov. 12, 2009

(65) Prior Publication Data

US 2010/0122433 A1  May 20, 2010

(30) Foreign Application Priority Data

Nov. 17, 2008 (TW) .............................. 97144315 A

(51) Int. Cl.
*E05D 11/10* (2006.01)
(52) U.S. Cl. .......................................... 16/330; 16/342
(58) Field of Classification Search .................. 16/330, 16/303, 334, 297, 340, 342, 374, 386; 348/333.06
See application file for complete search history.

(56) References Cited

U.S. PATENT DOCUMENTS

| 5,239,731 | A  | * | 8/1993  | Lu ................................... | 16/340 |
| 5,913,351 | A  | * | 6/1999  | Miura ............................. | 16/340 |
| 6,154,925 | A  | * | 12/2000 | Miura ............................. | 16/338 |
| 6,618,903 | B2 | * | 9/2003  | Kim ................................. | 16/337 |
| 7,155,781 | B2 | * | 1/2007  | Yamada et al. ................. | 16/367 |
| 8,042,230 | B2 | * | 10/2011 | Wang ............................. | 16/340 |

* cited by examiner

*Primary Examiner* — William L. Miller
(74) *Attorney, Agent, or Firm* — Bacon & Thomas, PLLC

(57) ABSTRACT

A rotating mechanism for an electronic device has a stationary seat with a limiting recess, a limiting ring mounted through the stationary seat with inner and outer limits, a shaft mounted through the stationary seat and the limiting ring with a limiting protrusion. With the limiting protrusion pushing the inner limit and the outer limit sliding in the limiting recess, the shaft achieves two stages of rotation to enhance the rotating angle in both directions. Moreover, with the adjusting of the sizes of the components, the rotating mechanism may provide rotating angle by 360 to 700 degrees.

12 Claims, 17 Drawing Sheets

ROTATING MECHANISM FOR AN ELECTRONIC DEVICE AND AN ELECTRONIC DEVICE WITH THE SAME

BACKGROUND OF THE INVENTION

1. Field of the Invention

The present invention relates to a rotating mechanism for an electronic device and an electronic device with the same, especially to a mechanism for various electronic devices to allow them pivoting.

2. Description of the Prior Arts

Electronic peripheral devices such as lens, joysticks and the like usually has a rotating mechanism mounted between two elements to allow pivoting and adjusting relating positions so that the electronic peripheral devices may have various usage.

With reference to FIG. 16, a conventional rotating mechanism for an electronic device comprises a first casing (70) and a second casing (80). The casings (70, 80) are hollow and have electrical components to provide desired functions for the electronic device.

The first casing (70) has a through hole formed through an end thereof and has a positioning resilient bar (71) and a positioning seat (72) mounted on beside the through hole.

The second casing (80) has a sleeve (81) extending from an end thereof. The sleeve (81) is mounted through the through hole of the first casing (70) and protrudes into the first casing (70). A shaft hole (811) is formed through a center of the sleeve (81) and communicates with inside room of the second casing (80) to allow electrical wires of electrical components in the first and second casings (70, 80) to mount through. A positioning wheel (82) is formed around a free end of the sleeve (81) and has multiple positioning ribs (821) formed separately on an end surface thereof and has a positioning protrusion (822) formed on and protruding from a periphery thereof.

With reference to FIG. 17, the cooperation of the positioning seat (72) and the positioning protrusion (822) limits the rotating angle of the casings (70, 80). However, when the positioning protrusion (822) of the positioning wheel (82) is rotated counterclockwise from one side to the other side of the positioning seat (72), the positioning wheel (82) cannot rotate by full 360 degrees because the positioning seat (72) has a certain thickness. The final position and the initial position of the positioning protrusion (822) include θ degrees. Although the positioning seat (72) and the positioning protrusion (822) may provide limiting function, the positioning wheel (82) cannot rotate by full 360 degrees and cannot rotate to the initial position unless it rotates backward. Therefore, the rotating angle is limited and the conventional rotating mechanism for the electronic device needs to be modified.

SUMMARY OF THE INVENTION

To overcome the shortcomings, the present invention provides a rotating mechanism for an electronic device to increase the rotating angles for both directions to provide various usage for the electronic device.

To achieve the objectives, the present invention provides a rotating mechanism for an electronic device with following structures.

A hollow stationary seat has a limiting recess formed transversely in an inside wall of the stationary seat.

A limiting ring is mounted through the stationary seat and has an outer limit formed on and protruding transversely from an outside wall of the limiting ring and mounted slidably in the limiting recess of the stationary seat, and an inner limit formed on and protruding transversely from an inside wall of the limiting ring.

A shaft is mounted through the stationary seat and the limiting ring and has a rod and a limiting protrusion formed on and protruding transversely from an outside wall of the rod and abutting the inside wall of the limiting ring.

A rotating seat is mounted securely around the shaft and adjacent to the stationary seat.

A fastening ring is mounted securely around a free end of the rod of the shaft to hold the stationary seat, the limiting ring and the rotating seat around the shaft.

When the present invention is used in an electronic device with a stationary shell and a rotating shell, the stationary seat is attached to the stationary shell and the rotating seat is attached to the rotating shell.

The present invention has following advantages. By the limiting protrusion of the shaft, the inner and outer limits of the limiting ring and the limiting recess of the stationary seat, the rotating seat and the shaft achieve two stages of rotation. Moreover, with adjusting the sizes of the limiting protrusion, the inner limit, the outer limit and the limiting recess, the present invention can provide 360 to 700 degrees of the relating rotation between the stationary seat and the rotating seat.

DETAILED DESCRIPTION OF THE PREFERRED EMBODIMENTS

Figure 1:
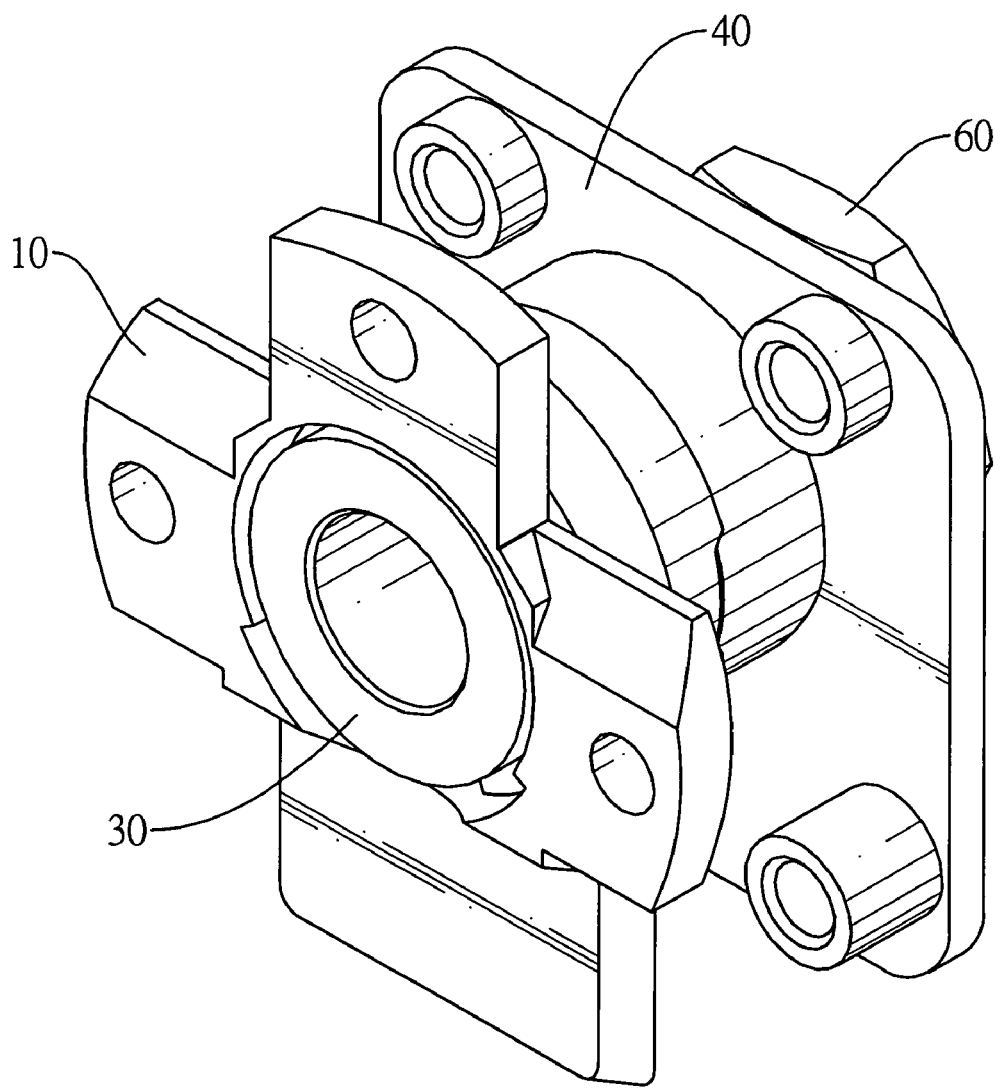
FIG. 1 is a perspective view of a rotating mechanism for an electronic device in accordance with the present invention.
Figure 2:
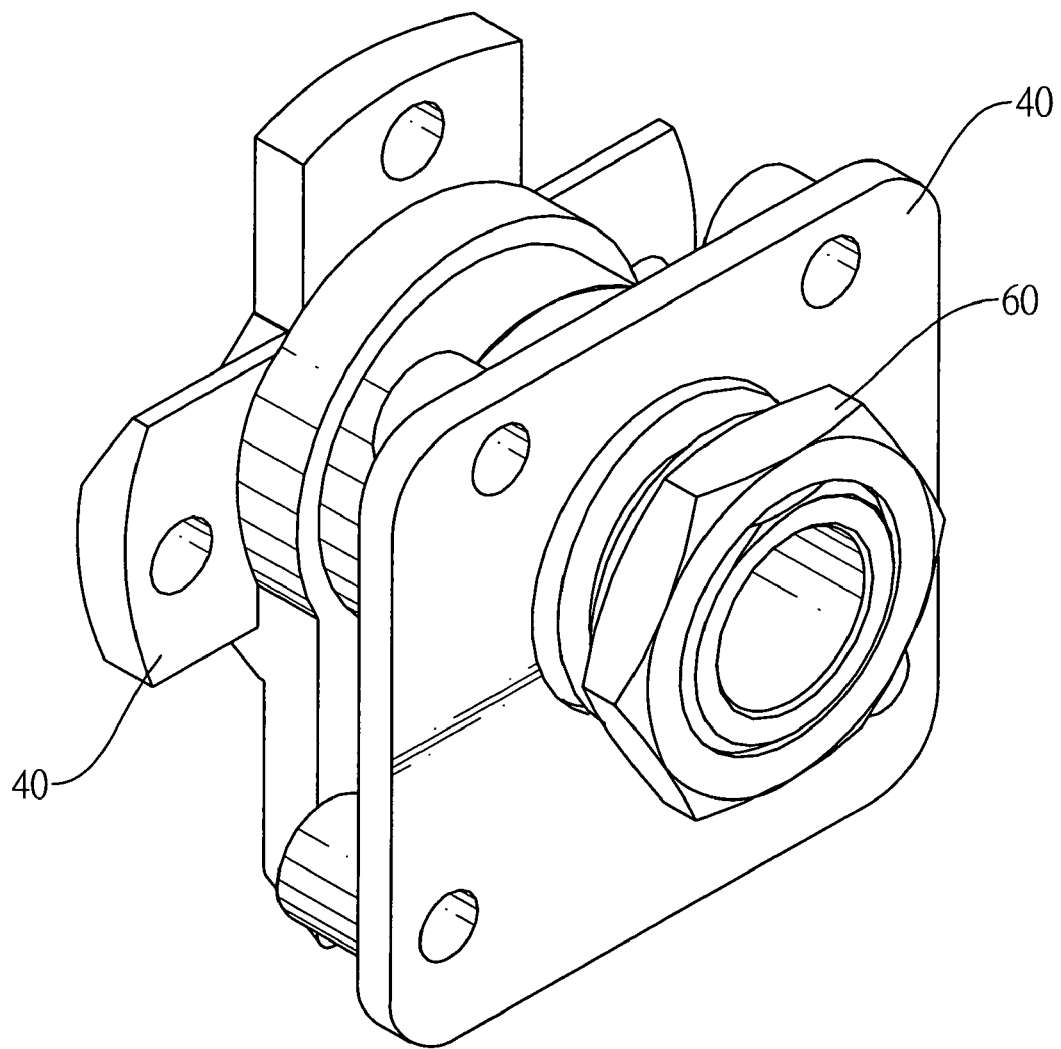
FIG. 2 is another perspective view of a rotating mechanism in FIG. 1.
Figure 3:
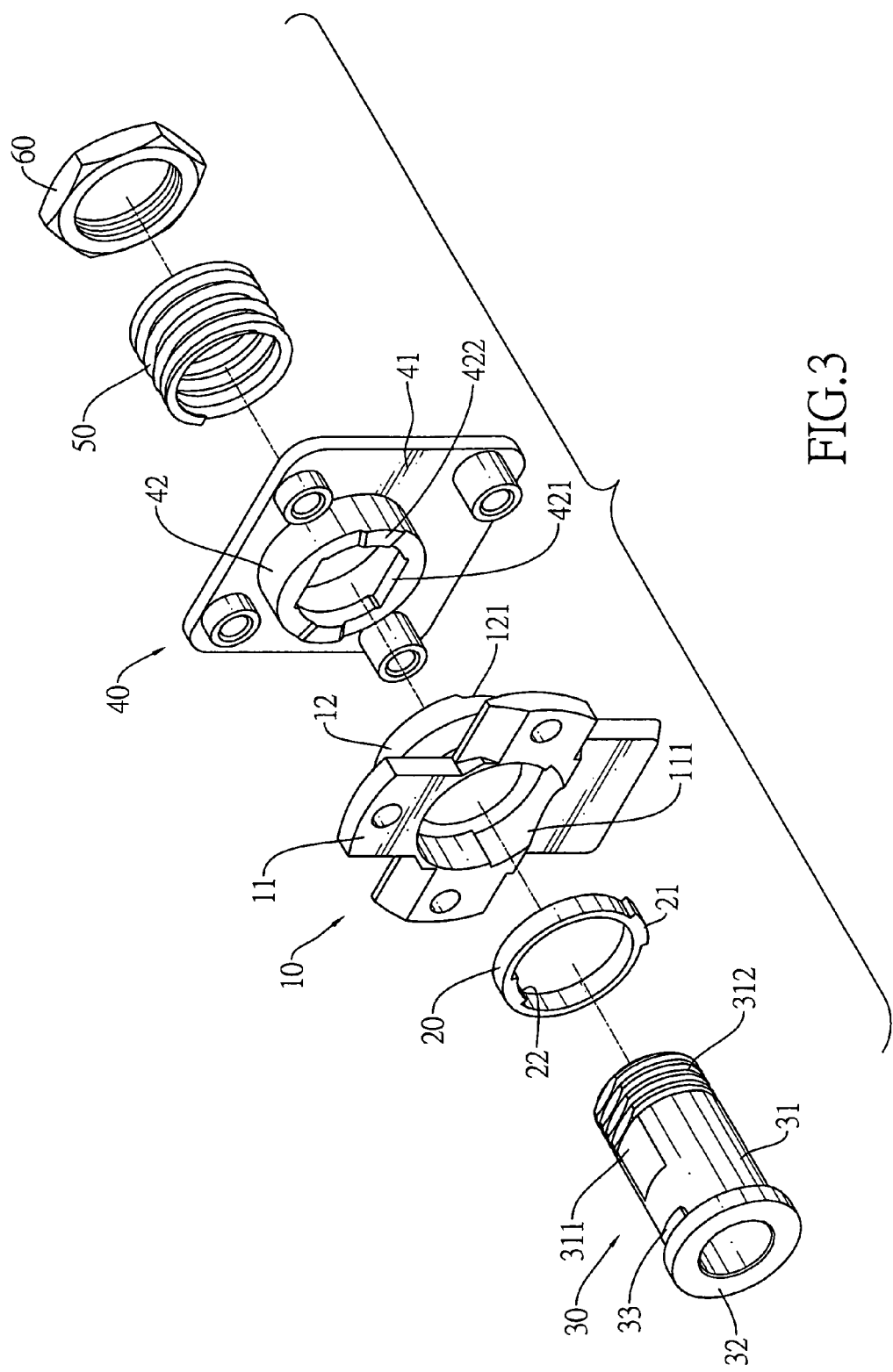
FIG. 3 is an exploded perspective view of the rotating mechanism in FIG. 1.

With reference to FIGS. 1 to 3, a rotating mechanism for an electronic device in accordance with the present invention comprises a stationary seat (10), a limiting ring (20), a shaft (30), a rotating seat (40), a resilient element and a fastening ring (60).

Figure 4:
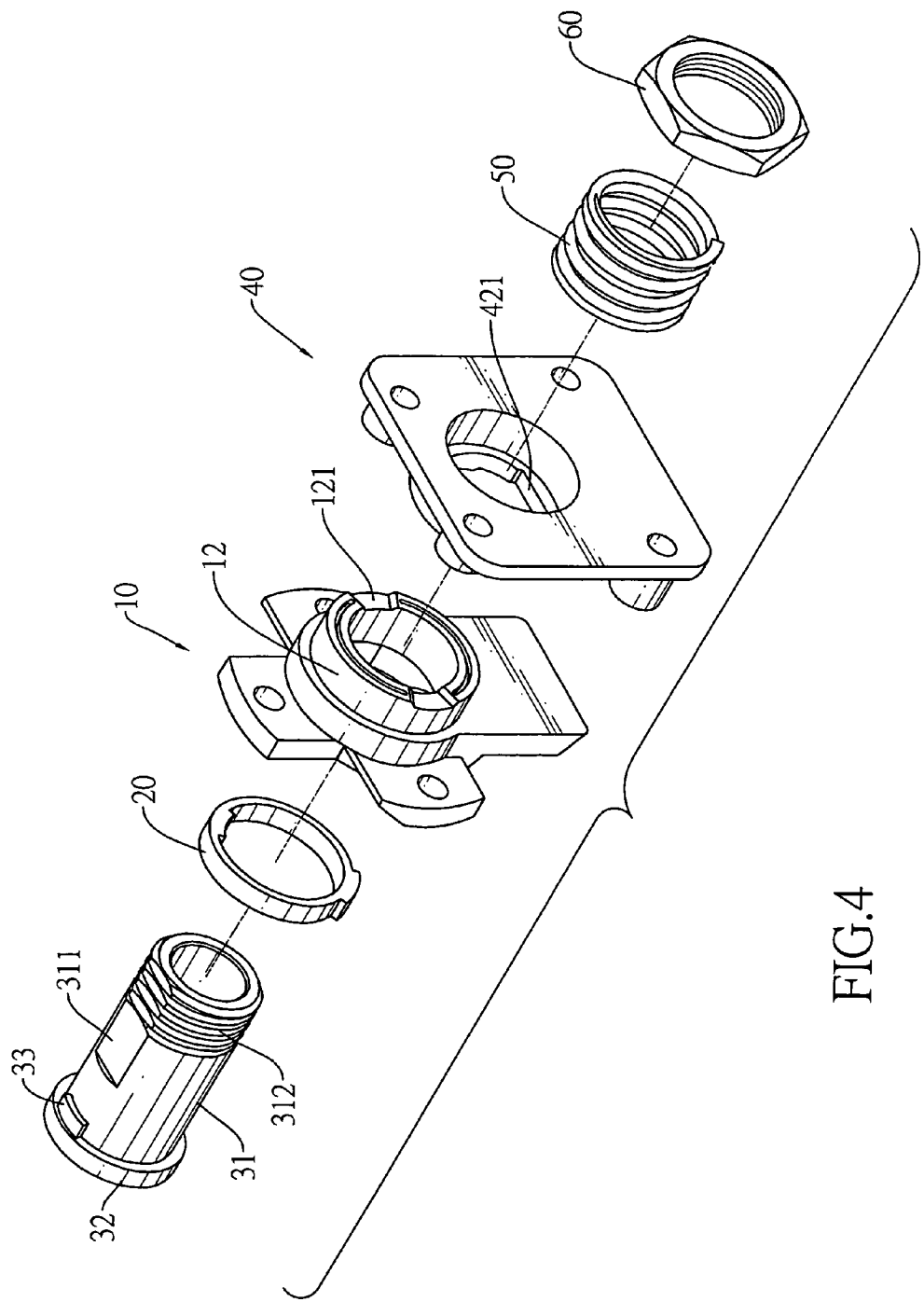
FIG. 4 is another exploded perspective view of the rotating mechanism in FIG. 1.
Figure 5:
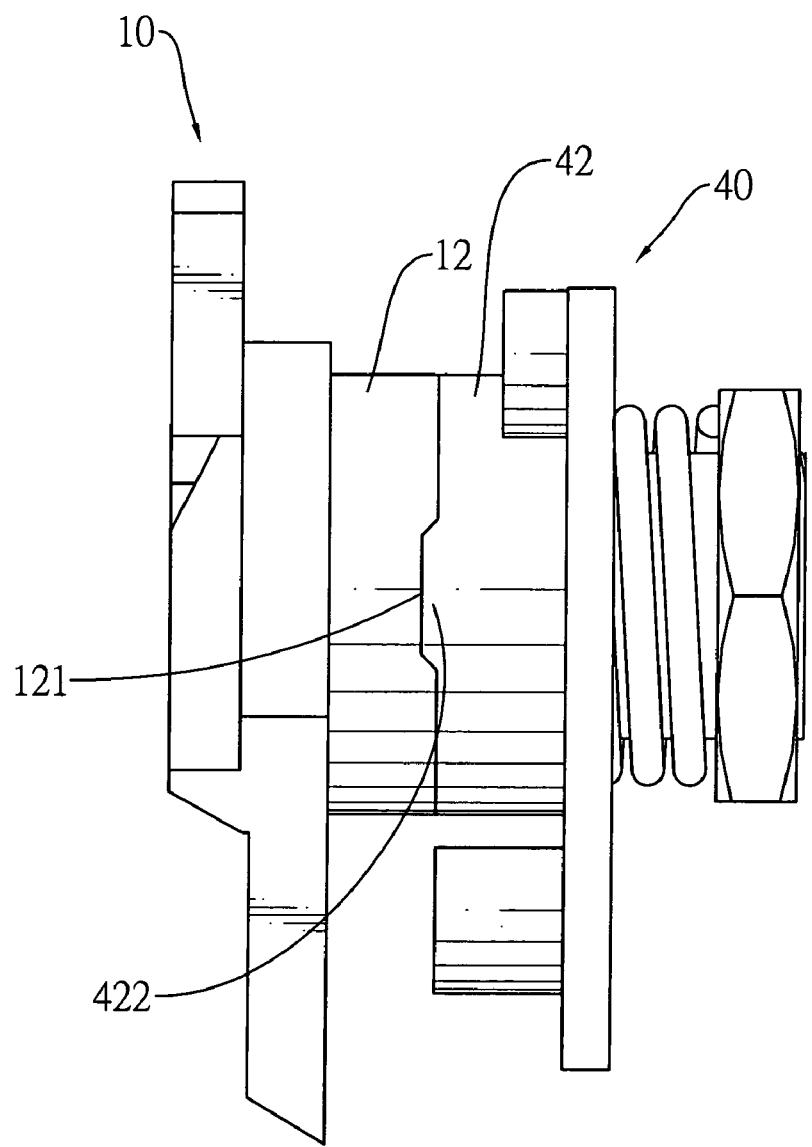
FIG. 5 is a side view of the rotating mechanism in FIG. 1.

With reference to FIGS. 3 to 5, the stationary seat (10) has a stationary board (11) and a stationary sleeve (12). The stationary board (11) is hollow and has a limiting recess (111) formed transversely in an inside wall thereof. The stationary sleeve (12) protrudes axially from a face of the stationary board (11). The inner diameter of the stationary sleeve (12) is smaller than the inner diameter of the stationary board (11). A positioning assembly is formed on a free end of the stationary sleeve (12) and may be two positioning detents (121) opposite to each other.

Figure 6:
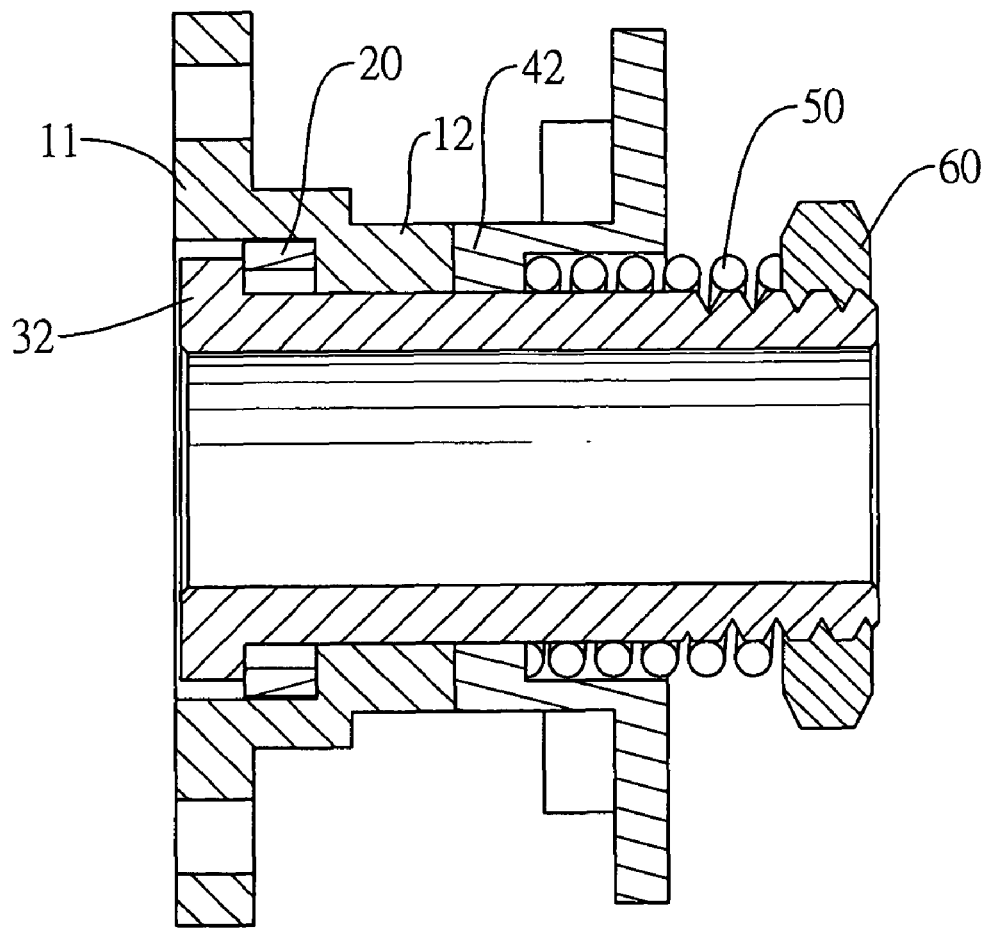
FIG. 6 is a side view in partial section of the rotating mechanism in FIG. 1.
Figure 7:
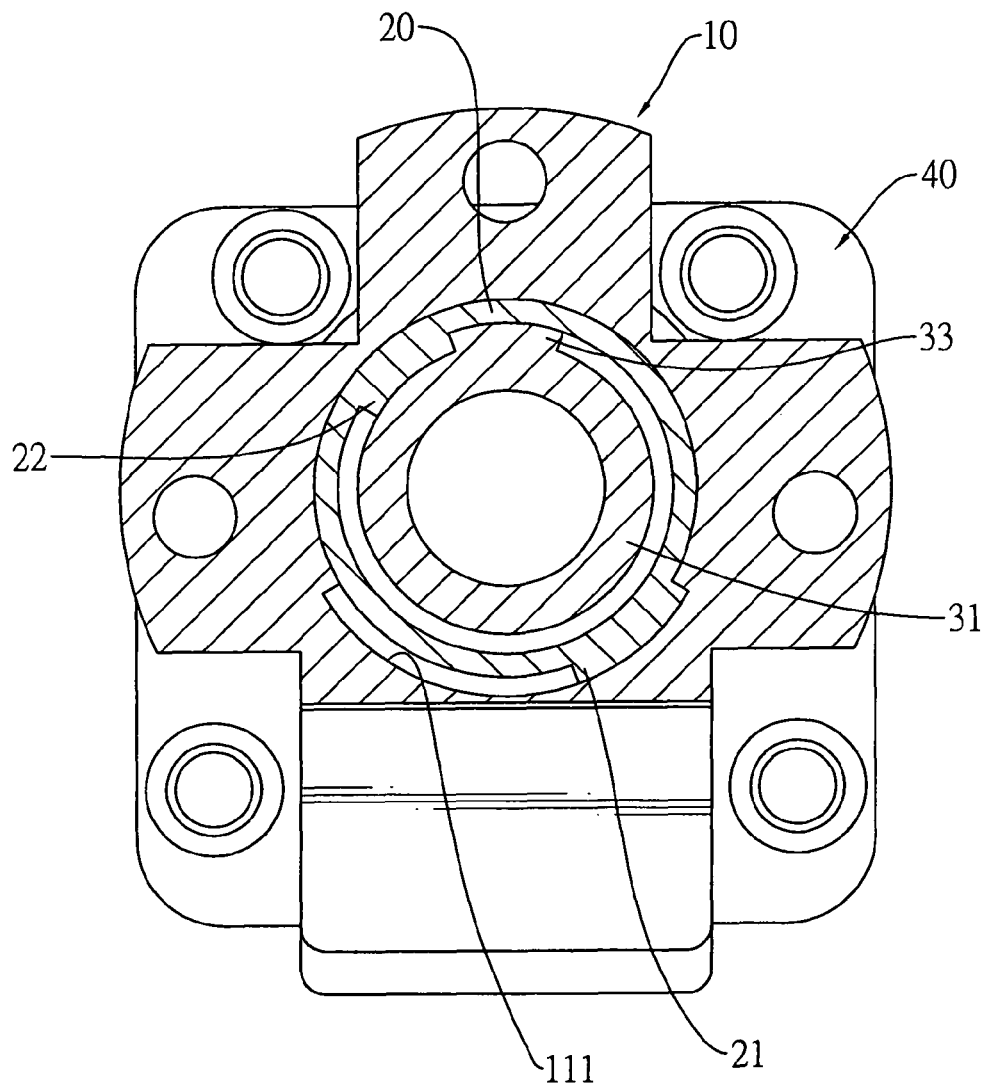
FIG. 7 is an operational end view in partial section of the rotating mechanism in FIG. 1.
Figure 8:
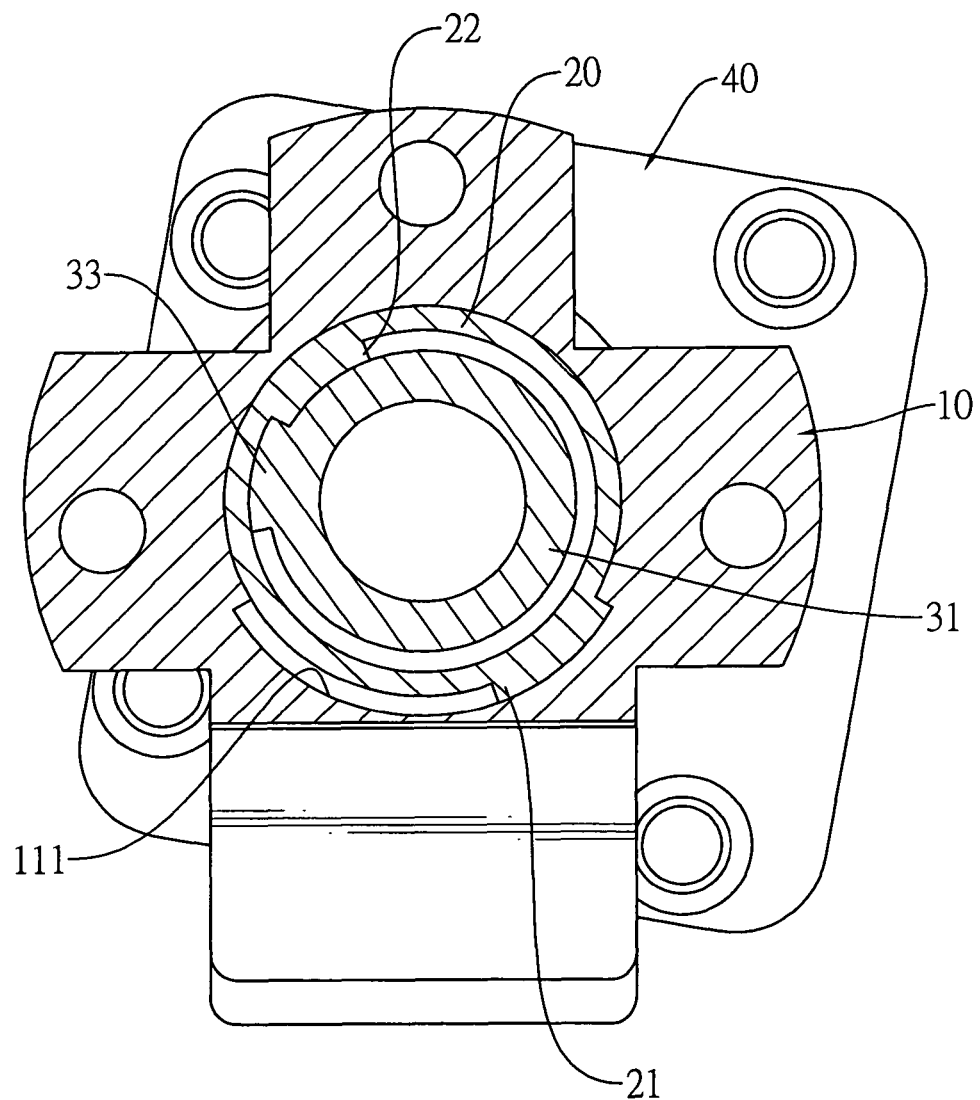
FIG. 8 is another operational end view in partial section of the rotating mechanism in FIG. 1.
Figure 9:
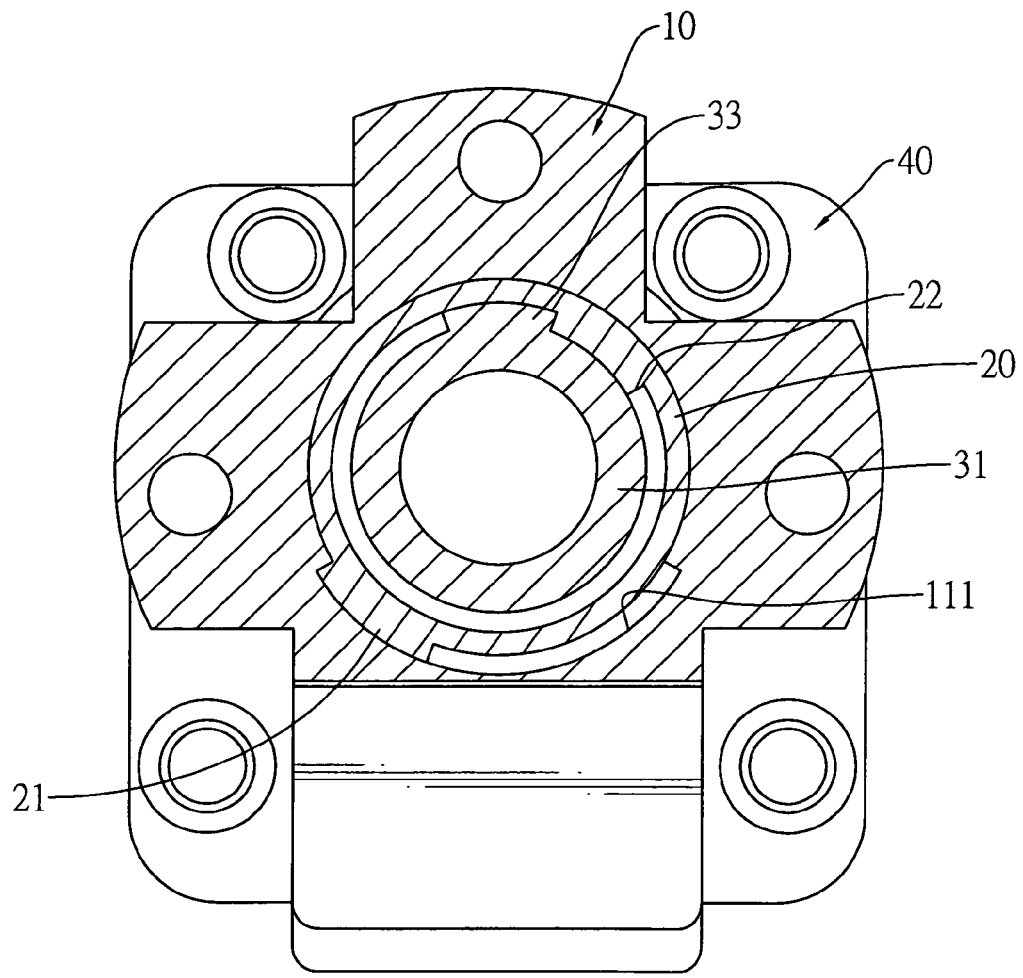
FIG. 9 is still another operational end view in partial section of the rotating mechanism in FIG. 1.
Figure 10:
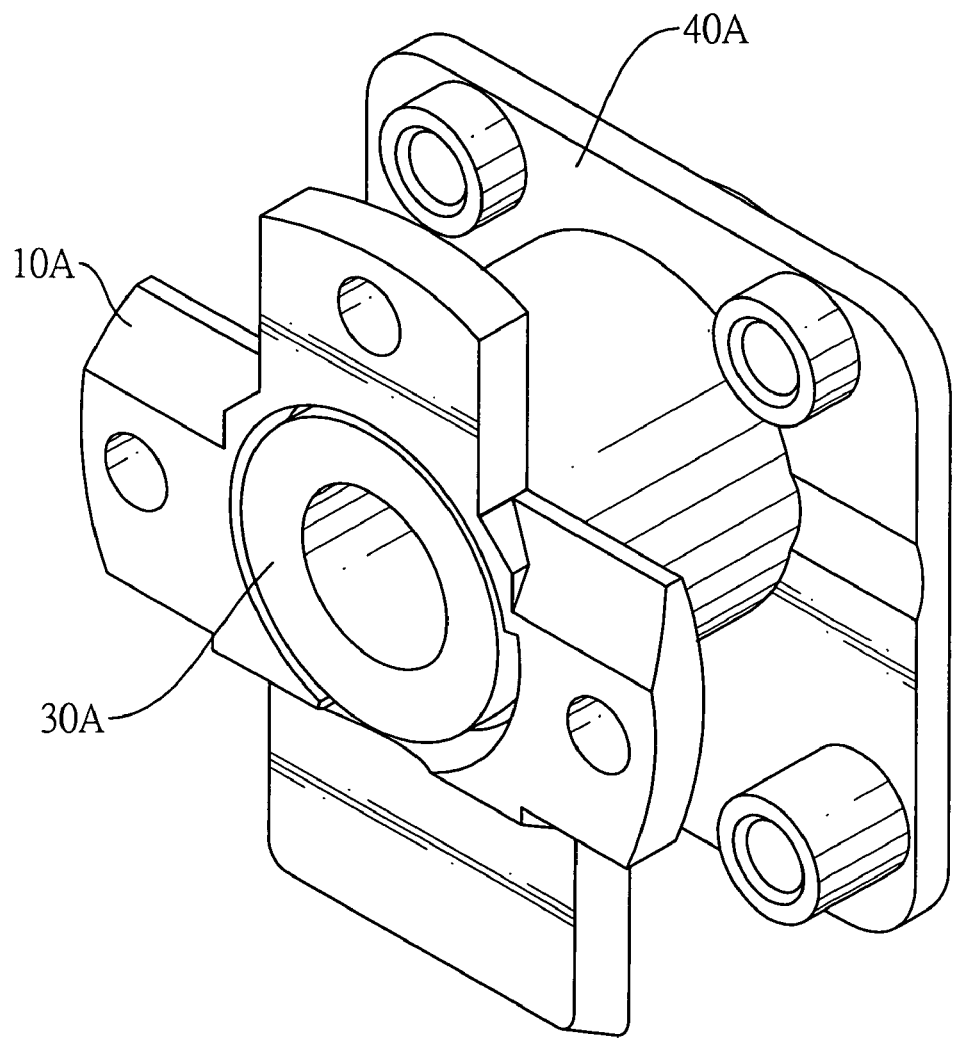
FIG. 10 is a perspective view of another embodiment of a rotating mechanism in accordance with the present invention.
Figure 11:
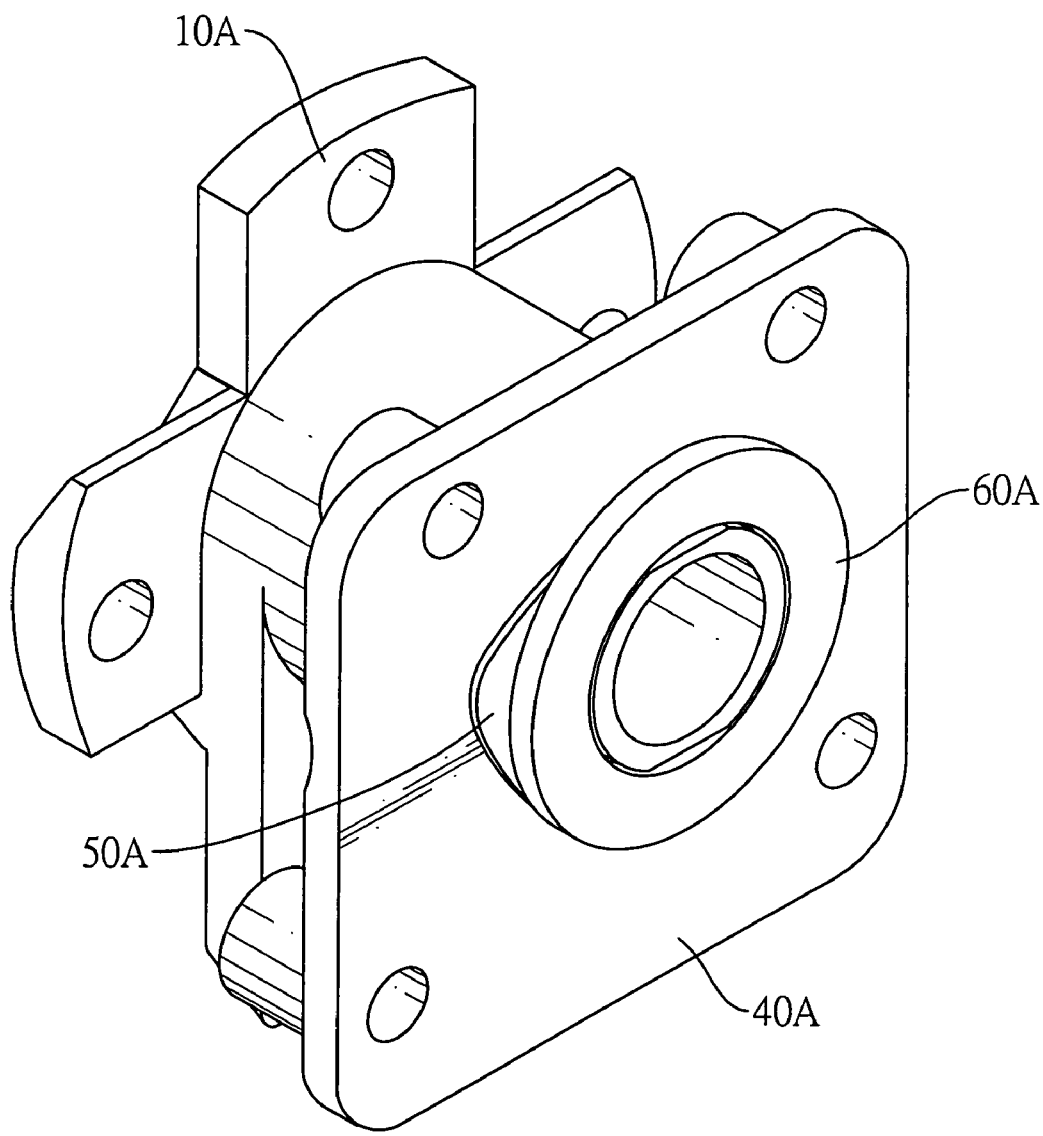
FIG. 11 is another perspective view of the rotating mechanism in FIG. 10.
Figure 12:
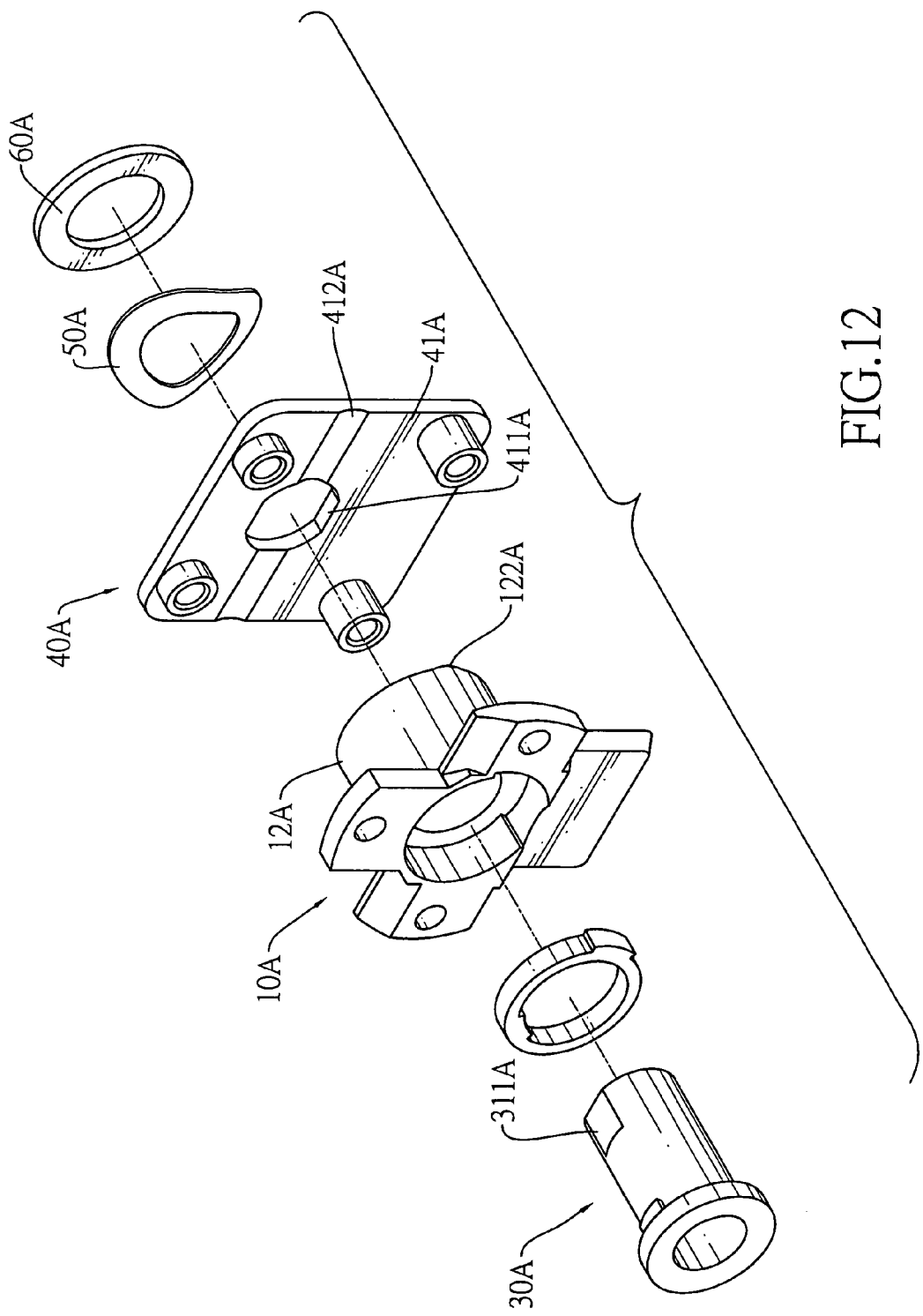
FIG. 12 is an exploded perspective view of the rotating mechanism in FIG. 10.
Figure 13:
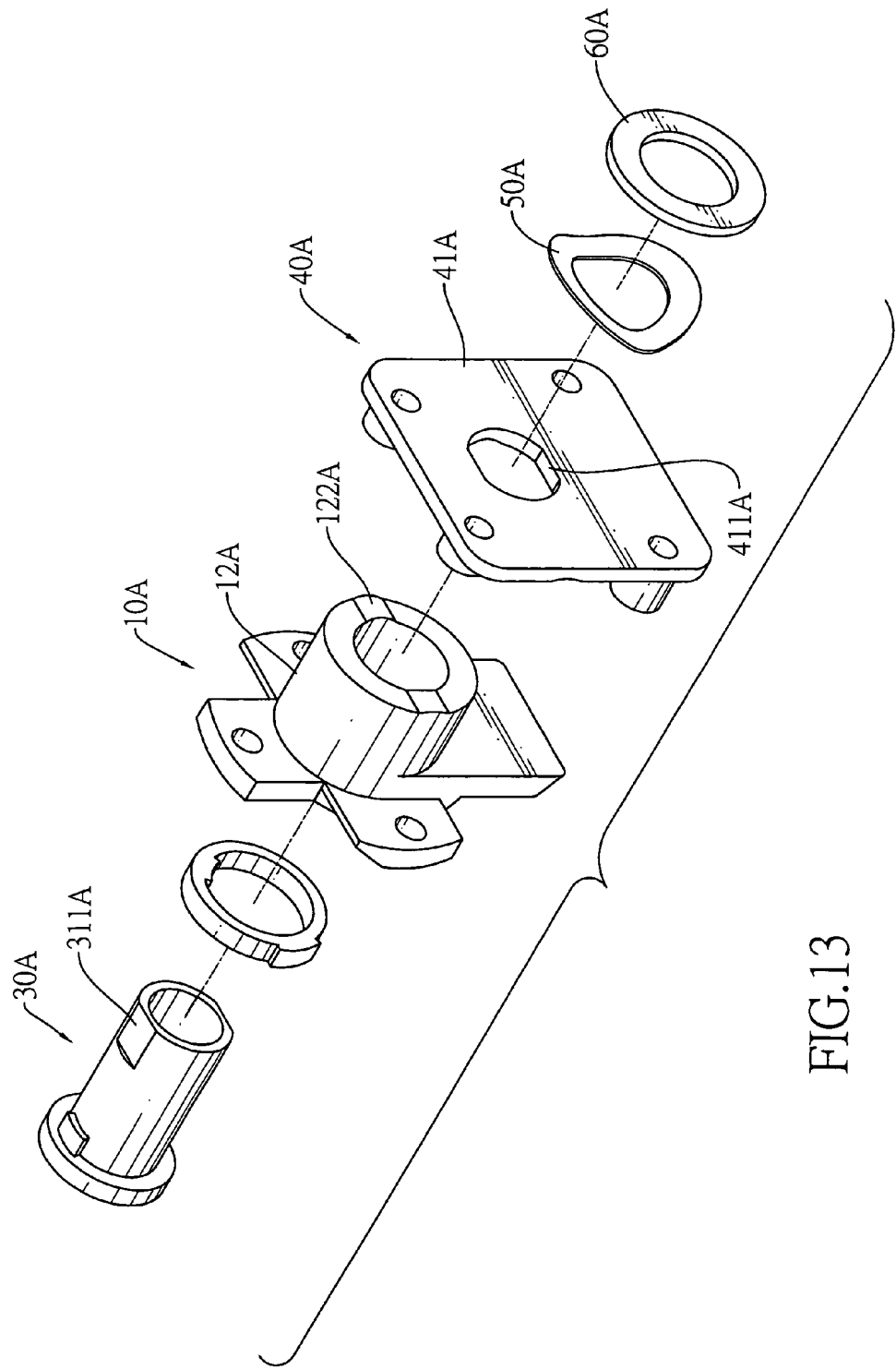
FIG. 13 is another exploded perspective view of the rotating mechanism in FIG. 10.
Figure 14:
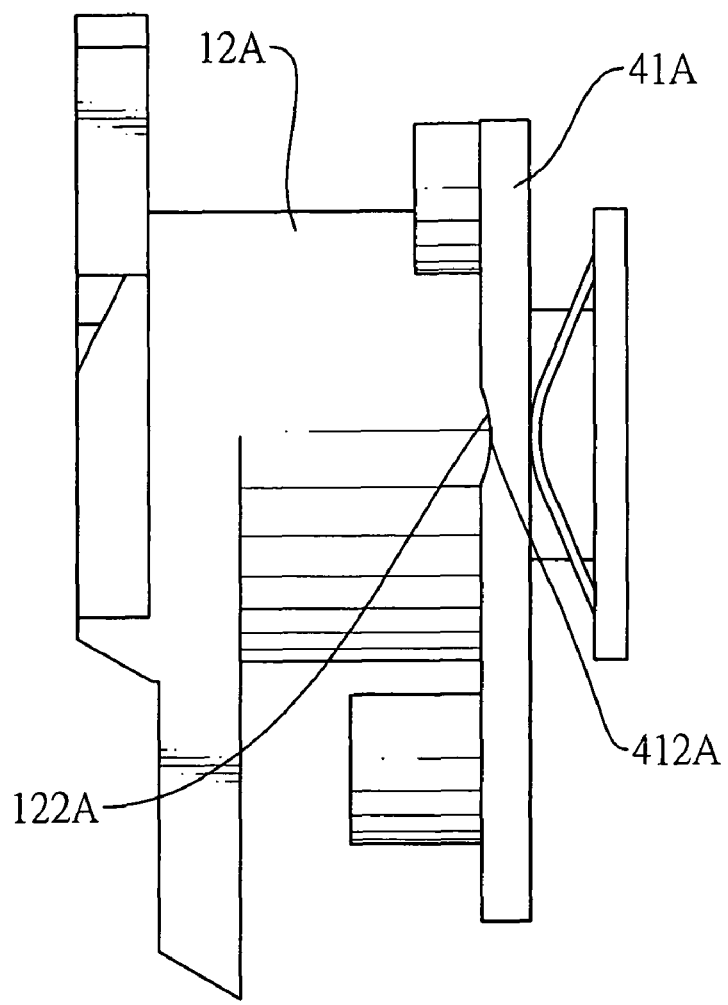
FIG. 14 is a side view of the rotating mechanism in FIG. 10.
Figure 15:
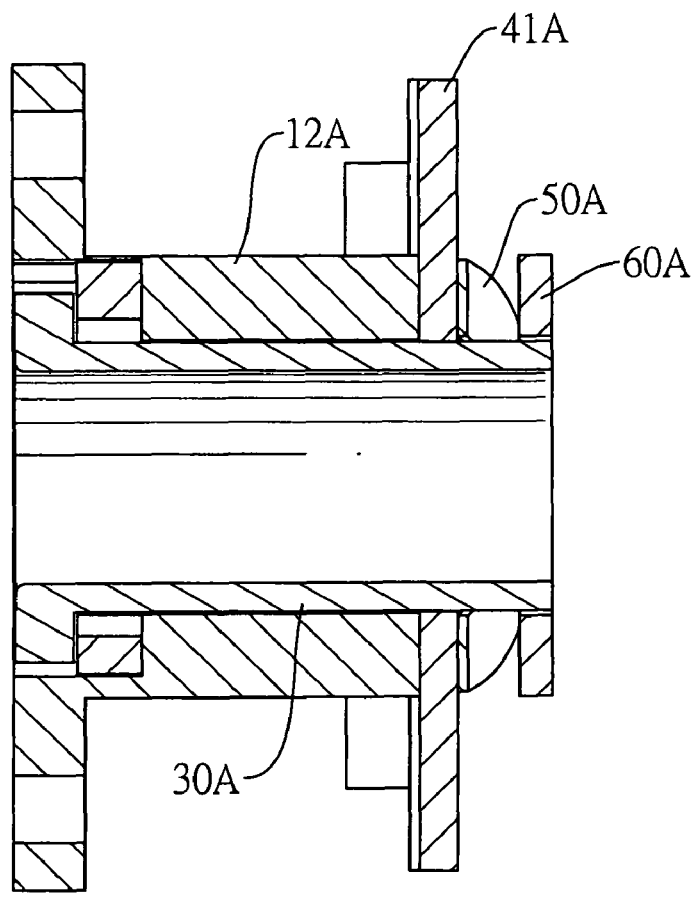
FIG. 15 is a side view in partial section of the rotating mechanism in FIG. 10.
Figure 16:
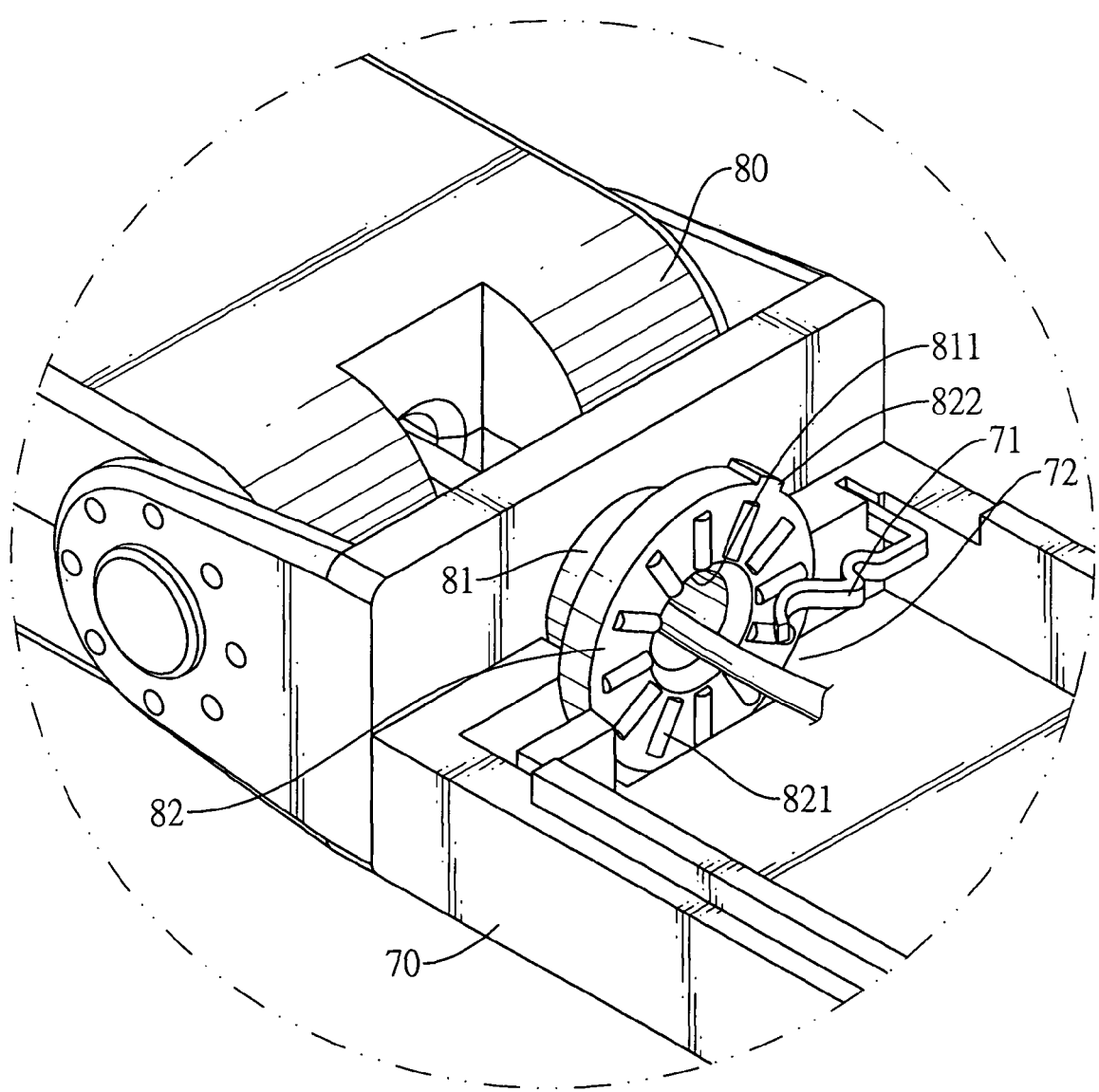
FIG. 16 is an enlarged perspective view of a conventional rotating mechanism in accordance with the prior art.
Figure 17:
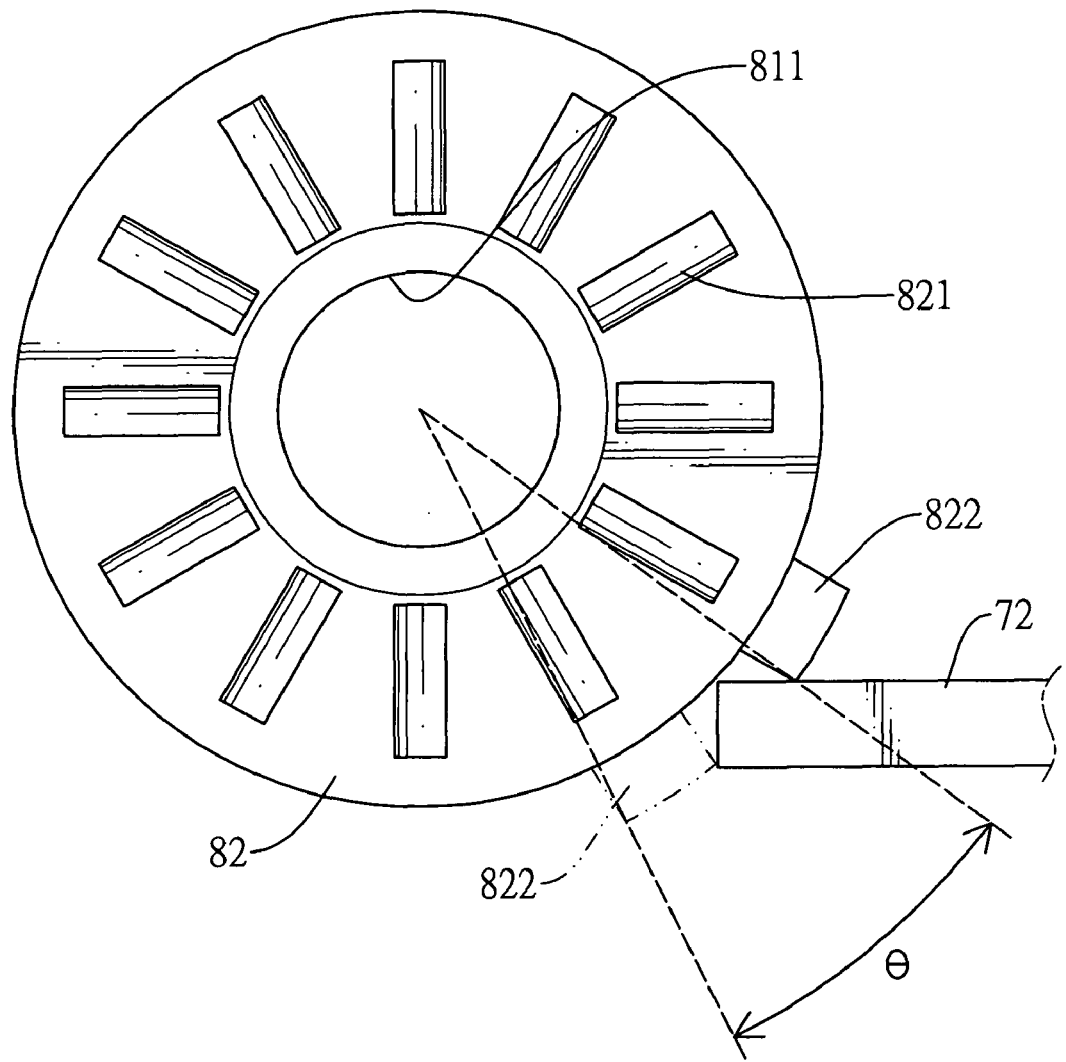
FIG. 17 is a partially end view of the conventional rotating mechanism in FIG. 16.

With reference to FIGS. 3 and 6, the limiting ring (20) is mounted through the stationary seat (10) and abuts a connecting end of the stationary sleeve (12). An outer limit (21) is formed on and protrudes transversely from an outside wall of the limiting ring (20) and is mounted slidably in the limiting recess (111) of the stationary seat (10). An inner limit (22) is formed on and protrudes transversely from an inside wall of the limiting ring (20) and may be opposite by 180 degrees to the outer limit (21).

With reference to FIGS. 3 and 4, the shaft (30) is mounted through the stationary seat (10) and the limiting ring (20) and has a rod (31), an enlarged head (32) and a limiting protrusion (33). The rod (31) has a free end and a connecting end. Two flat surfaces (311) are formed oppositely on an outside wall of the rod (31). A threaded part (312) is formed around the rod (31) near the connecting end thereof. The enlarged head (32) is formed around the free end of the rod (31) and is mounted through the stationary board (11) of the stationary seat (10). The limiting protrusion (33) is formed on and protrudes transversely from the outside wall of the rod (31) near the free end thereof, abuts the inside wall of the limiting ring (20) and corresponds to the inner limit (22) of the limiting ring (20).

With reference to FIGS. 3 to 5, the rotating seat (40) is mounted securely around the shaft (30) and has a hollow rotating board (41) and a rotating sleeve (42). The rotating sleeve (42) is formed on and protrudes axially from a face of the rotating board (41). The inner diameter of the rotating sleeve (42) is smaller than the inner diameter of the rotating board (41). Two flat surfaces (421) are formed oppositely on an inside wall of the rotating sleeve (42) and are attached to the flat surfaces (311) of the rod (31) to mount the rotating seat (40) securely around the shaft (30). A positioning assembly is formed on a free end of the rotating sleeve (42). The positioning assembly of the rotating sleeve (42) corresponds to and engages with the positioning assembly of the stationary sleeve (12) to keep the rotating seat (40) from rotating relative to the stationary seat (10). The positioning assembly of the rotating sleeve (42) may be two opposite positioning protrusions (422).

With reference to FIGS. 3 and 6, the resilient element is mounted around the rod (31) of the shaft (30) and pushes the rotating seat (40) so that the positioning assembly of the rotating seat (40) tightly engages with the positioning assembly of the stationary seat (10). The resilient element may be a spring (50). The spring (50) is mounted through the rotating seat (40). One end of the spring (50) abuts the connecting end of the rotating sleeve (42).

With reference to FIGS. 3 and 6, the fastening ring (60) is mounted securely around the free end of the rod (31) of the shaft (30) and may be a nut to be screwed onto the threaded part (312) of the rod (31) of the shaft (30).

When the present invention is used in an electronic device with a stationary shell and a rotating shell, the stationary seat (10) and the rotating seat (40) are attached respectively to the shells. To rotate one shell relative the other shell, the shells are pulled toward opposite directions to disengage the positioning assemblies of the stationary and rotating seats (10, 40). Then the stationary and rotating seats (10, 40) are able to rotate relative each other so that the shells are able to rotate relative each other.

With reference to FIGS. 3, 4 and 7 to 9, when the rotating seat (40) is rotated relative to the stationary seat (10), the shaft (30) is rotated simultaneously. The limiting protrusion (33) slides along the inside wall of the limiting ring (20). When the limiting protrusion (33) abuts the inner limit (22) of the limiting ring (20), the limiting protrusion (33) pushes the inner limit (22) to force the limiting ring (20) keep rotating by the shaft (30) and the rotating seat (40). The outer limit (21) of the limiting ring (21) slides in the limiting recess (111) of the stationary seat (10) until the outer limit (21) abuts one end of the limiting recess (111) of the stationary seat (10). Then the limiting ring (20) is blocked to stop the rotating seat (40) from rotating.

Therefore, the present invention utilizes the rotation of the shaft (30) at first stage and the rotation of the shaft (30) pushing the limiting ring (20) at second stage to achieve two stages rotation. With adjusting the sizes of the limiting protrusion (33), the inner limit (22), the outer limit (21) and the limiting recess (111), the present invention can provide 360 to 700 degrees of the relating rotation between the stationary seat (10) and the rotating seat (40).

With reference to FIGS. 10 to 15, a second embodiment of the rotating mechanism in accordance with the present invention is similar to the aforesaid embodiment of the rotating mechanism, but the detail differences are recited below.

The fastening ring (60A) is riveted onto the shaft (30A).

The rotating seat (40A) only comprises a hollow rotating board (41A). the rotating board (41A) has two opposite flat surfaces (411A) formed in an inside wall thereof. The flat surfaces (411A) of the rotating seat (41A) are attached respectively to the flat surfaces (311A) of the shaft (30A). The positioning assembly of the rotating seat (40A) is two positioning recesses (412A) formed in one side of the rotating board (41A). Accordingly, the positioning assembly of the stationary sleeve (12A) of the stationary seat (10A) is two opposite positioning protrusions (122A).

The resilient element is a resilient washer (50A) mounted around the shaft (30A) and abutting between the rotating seat (40A) and the fastening ring (60A).

Noteworthily, when the present invention is used in an electronic device with a stationary shell and a rotating shell, the stationary seat (10) and the rotating seat (40) are attached respectively to the shells. Therefore, the relating positions of the shells of the electronic device are adjustable, such as the steering wheel for computer game (i.e. the relating rotation between the steering wheel and the supporting rod). On the other hand, the adjustable positions for the shells also help to change the appearance of the electronic device so that one electronic device may have various appearances.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A rotating mechanism for an electronic device comprising:

a hollow stationary seat having a limiting recess formed transversely in an inside wall of the stationary seat;

a limiting ring mounted through the stationary seat and having
- an outer limit formed on and protruding transversely from an outside wall of the limiting ring and mounted slidably in the limiting recess of the stationary seat; and
- an inner limit formed on and protruding transversely from an inside wall of the limiting ring;

a shaft mounted through the stationary seat and the limiting ring and having
- a rod; and
- a limiting protrusion formed on and protruding transversely from an outside wall of the rod and abutting the inside wall of the limiting ring;

a rotating seat mounted securely around the shaft and adjacent to the stationary seat; and a fastening ring mounted securely around a free end of the rod of the shaft to hold the stationary seat, the limiting ring and the rotating seat around the shaft.

2. The rotating mechanism as claimed in claim 1, wherein the stationary seat has a hollow stationary board;
the limiting recess of the stationary seat is formed transversely in an inside wall of the stationary board; and
the limiting ring is mounted through the stationary board.

3. The rotating mechanism as claimed in claim 2, wherein the stationary seat has a stationary sleeve protruding axially from a face of the stationary board;
an inner diameter of the stationary sleeve is smaller than an inner diameter of the stationary board; and
the limiting ring abuts a connecting end of the stationary sleeve.

4. The rotating mechanism as claimed in claim 3, wherein the stationary seat has a positioning assembly formed on an end of the stationary sleeve of the stationary seat;
the rotating seat has a positioning assembly formed thereon and engaging the positioning assembly of the stationary seat; and
a resilient element is mounted around the shaft and pushes the rotating seat.

5. The rotating mechanism as claimed in claim 4, wherein the positioning assembly of the stationary seat is two opposite positioning recesses formed respectively in the end of the stationary sleeve;
the rotating seat has
- a hollow rotating board; and
- a rotating sleeve formed on and protruding axially from a face of the rotating board, wherein an inner diameter of the rotating sleeve is smaller than an inner diameter of the rotating board; and the positioning assembly of the rotating seat is two opposite positioning protrusions formed on a free end of the rotating sleeve.

6. The rotating mechanism as claimed in claim 5, wherein the shaft has two flat surfaces formed oppositely on the outside wall of the rod; and
the rotating seat has two flat surfaces formed oppositely on an inside wall of the rotating sleeve and attached to the flat surfaces of the rod of the shaft.

7. The rotating mechanism as claimed in claim 6, wherein the shaft has a threaded part formed around the outside wall of the rod near a connecting end of the rod; and
the fastening ring is a nut screwed onto the threaded part of the shaft.

8. The rotating mechanism as claimed in claim 7, wherein the resilient element is a spring mounted through the rotating seat and having an end abutting a connecting end of the rotating sleeve.

9. The rotating mechanism as claimed in claim 4, wherein the positioning assembly of the stationary seat is two opposite positioning protrusions formed respectively in an end of the stationary sleeve;
the rotating seat has a hollow rotating board; and
the positioning assembly of the rotating seat is two opposite positioning recesses formed in one side of the rotating board.

10. The rotating mechanism as claimed in claim 9, wherein the shaft has two flat surfaces formed oppositely on the outside wall of the rod; and
the rotating seat has two flat surfaces formed oppositely on an inside wall of the rotating board and attached respectively to the flat surfaces of the shaft.

11. The rotating mechanism as claimed in claim 10, wherein the fastening ring is riveted onto the shaft.

12. The rotating mechanism as claimed in claim 11, wherein the resilient element is a resilient washer mounted around the shaft and abutting between the rotating seat and the fastening ring.

* * * * *